US012610245B2

(12) United States Patent
Zhu et al.

(10) Patent No.: US 12,610,245 B2
(45) Date of Patent: Apr. 21, 2026

(54) DYNAMIC SPECTRUM ACCESS FOR SINGLE-CHANNEL MOBILE AD-HOC NETWORKS

(71) Applicant: TrellisWare Technologies, Inc., San Diego, CA (US)

(72) Inventors: Hua Zhu, San Diego, CA (US); Cenk Köse, San Diego, CA (US)

(73) Assignee: TRELLISWARE TECHNOLOGIES, INC., San Diego, CA (US)

( * ) Notice: Subject to any disclaimer, the term of this patent is extended or adjusted under 35 U.S.C. 154(b) by 307 days.

(21) Appl. No.: 18/571,822

(22) PCT Filed: Jun. 23, 2022

(86) PCT No.: PCT/US2022/034688
§ 371 (c)(1),
(2) Date: Dec. 19, 2023

(87) PCT Pub. No.: WO2022/271927
PCT Pub. Date: Dec. 29, 2022

(65) Prior Publication Data
US 2024/0196226 A1 Jun. 13, 2024

Related U.S. Application Data

(60) Provisional application No. 63/214,561, filed on Jun. 24, 2021.

(51) Int. Cl.
*H04W 16/14* (2009.01)
*H04B 7/26* (2006.01)
(Continued)

(52) U.S. Cl.
CPC ............ *H04W 16/14* (2013.01); *H04B 7/265* (2013.01); *H04W 72/541* (2023.01); *H04W 84/18* (2013.01); *H04W 88/06* (2013.01)

(58) Field of Classification Search
CPC .... H04B 7/264; H04W 16/14; H04W 72/541; H04W 84/18; H04W 88/06
See application file for complete search history.

(56) References Cited

U.S. PATENT DOCUMENTS

2002/0067736 A1 6/2002 Garcia-Luna-Aceves et al.
2010/0075704 A1 3/2010 McHenry et al.
(Continued)

OTHER PUBLICATIONS

International Search Report and Written Opinion mailed on Sep. 23, 2022 for International Patent Application No. PCT/US2022/034668, of TrellisWare Technologies, Inc., 8 pages.
Ma et al., "Single-Radio Adaptive Channel Algorithm for Spectrum Agile Wireless Ad Hoc Networks," IEEE Rretrieved on Aug. 26, 2022, 12 pages.
Trellisware, "Treliware Proves Army Company-Wide Flat Networking Possible Down to Every Soldier Using Single 1.2 MHZ RF Channel," (Jul. 28, 2017), 6 pages.
(Continued)

*Primary Examiner* — Brian P Cox
(74) *Attorney, Agent, or Firm* — PERKINS COIE LLP

(57) ABSTRACT

Methods, systems, and devices for dynamic spectrum access in a single-channel MANET are described. An example system for network management includes a first wireless device configured to perform, using a receive mode and a transmit mode, data communications on a first channel associated with a first single-channel network, and transmit, using the transmit mode, network advertisement messages on a second channel associated with a second single-channel network, wherein each of the network advertisement messages comprises one or more characteristics of the first single-channel network, and a second wireless device configured to perform, using the receive mode and the transmit mode, data communications on the second channel, acquire, using the receive mode, at least one network advertisement message of the network advertisement messages on the second channel, and perform, based on the at least one network advertisement message, a comparison between the first single-channel network and the second single-channel network.

20 Claims, 10 Drawing Sheets

(51) Int. Cl.
  *H04W 72/541* (2023.01)
  *H04W 84/18* (2009.01)
  *H04W 88/06* (2009.01)

(56) References Cited

U.S. PATENT DOCUMENTS

| | | | |
|---|---|---|---|
| 2013/0155913 A1 | 6/2013 | Sarca | |
| 2020/0059854 A1* | 2/2020 | Li | H04W 72/0453 |
| 2020/0236607 A1 | 7/2020 | Zhu et al. | |
| 2020/0260464 A1 | 8/2020 | Zhu et al. | |
| 2021/0058781 A1* | 2/2021 | Lewis | H04W 48/18 |
| 2021/0360412 A1* | 11/2021 | Chakraborty | H04W 72/21 |

OTHER PUBLICATIONS

Trellisware, "Trellisware Radios Are Equipped to Make Unmanned Solutions More Effective," (Apr. 26, 2018), 5 pages.
Wang et al., "A Multicast Scheme Based on Fidelity Metrics in Quantum Networks," IEEE Access (publication date: May 9, 2019), 11 pages.
Extended European Search Report mailed Apr. 14, 2025 for European Patent Application 22829297.5, 11 pages.
Watson et al., "Design of a Software Defined Radio-Based Tactical DSA Network," IEEE Military Communications Conference (Oct. 23, 2017).

\* cited by examiner

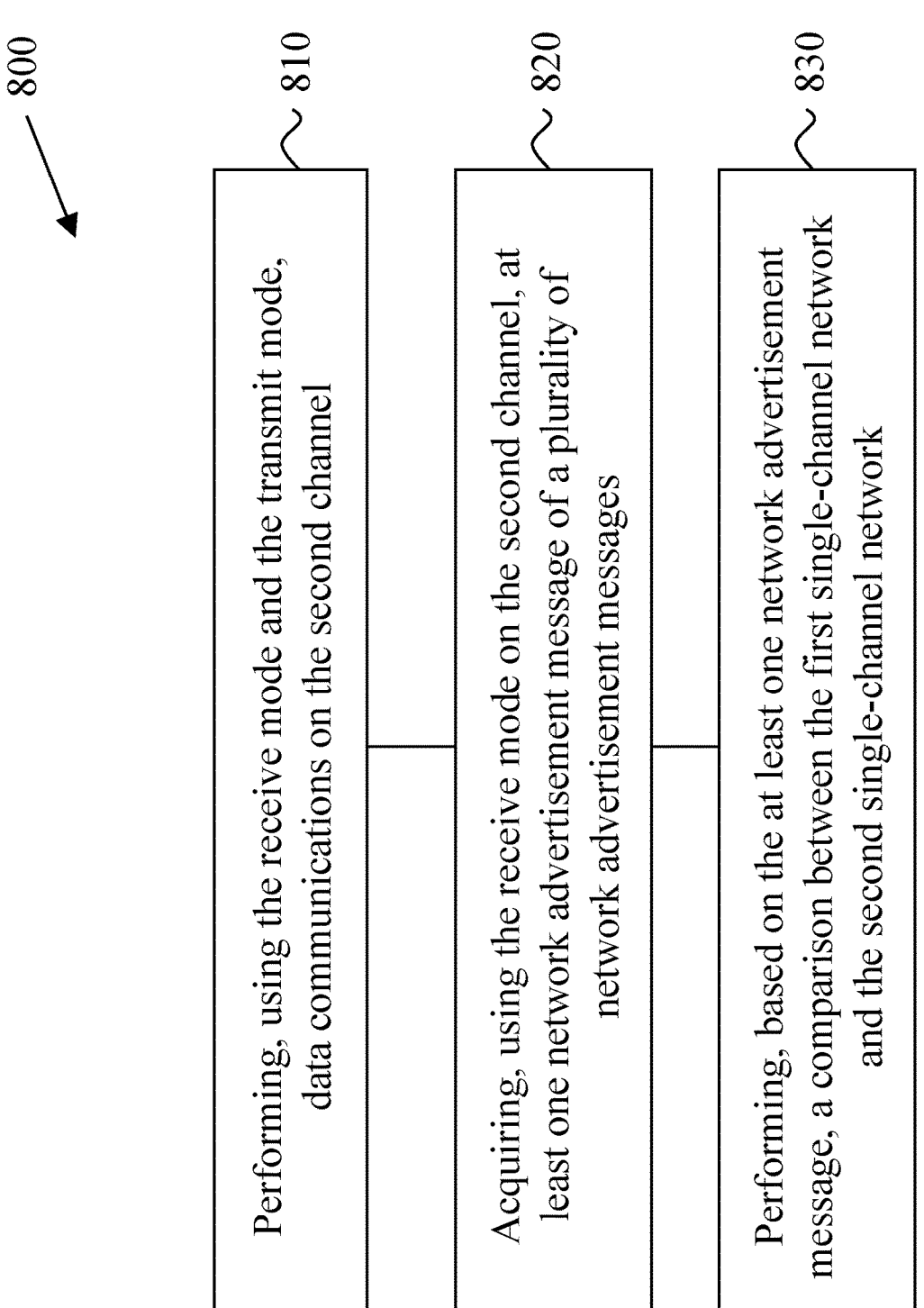

800

810 Performing, using the receive mode and the transmit mode, data communications on the second channel 820 Acquiring, using the receive mode on the second channel, at least one network advertisement message of a plurality of network advertisement messages 830 Performing, based on the at least one network advertisement message, a comparison between the first single-channel network and the second single-channel network

FIG. 8

DYNAMIC SPECTRUM ACCESS FOR SINGLE-CHANNEL MOBILE AD-HOC NETWORKS

CROSS-REFERENCE TO RELATED APPLICATION

This application is a 371 U.S. National Stage application of International Application No. PCT/US2022/034688, filed Jun. 23, 2022, which claims priority to U.S. Provisional Application No. 63/214,561 filed on Jun. 24, 2021, the disclosure of which is hereby incorporated by reference herein in its entirety.

TECHNICAL FIELD

This document generally relates to wireless networks, and more specifically, to dynamically accessing wireless spectrum for communication.

BACKGROUND

Dynamic spectrum access (DSA), also referred to as dynamic spectrum management (DSM), is a set of spectrum utilization techniques that adjusts frequency in real time based on fluctuating circumstances. Examples of circumstances that might affect spectrum allocation in DSA include energy conservation, battery life, interference, changes in environmental or external regulations and quality of service (QOS). In some implementations, DSA also provides the ability to share wireless channels between primary, or licensed, and secondary, or unlicensed, users.

SUMMARY

Embodiments of the disclosed technology are directed to using dynamic spectrum access (DSA) techniques for, among other network operations, network acquisition (e.g., join and merge) in mobile ad-hoc networks (MANETs). In an example, this is achieved by using radio frequency (RF) sensing in dedicated timeslots and frequency adaptation to switch the operating channel when the current operating channel degrades. This and other techniques are described in this document.

In an example, a system for wireless communication includes a first wireless device configured to perform, using a receive mode and a transmit mode, data communications on a first channel associated with a first single-channel network, and transmit, using the transmit mode, a plurality of network advertisement messages on a second channel associated with a second single-channel network, wherein each of the plurality of network advertisement messages comprises one or more characteristics of the first single-channel network. The system further includes a second wireless device configured to perform, using the receive mode and the transmit mode, data communications on the second channel, acquire, using the receive mode, at least one network advertisement message of the plurality of network advertisement messages on the second channel, and perform, based on the at least one network advertisement message, a comparison between the first single-channel network and the second single-channel network.

In another example, a system for wireless communication includes a plurality of nodes, wherein each of the plurality of nodes is configured to operate, using a time-division multiple access (TDMA) protocol, over a corresponding channel of each of a plurality of single-channel networks. In this example, the plurality of nodes includes a central node configured to determine, based on a plurality of sensing metrics associated with each of the plurality of nodes, a plurality of communication fidelity metrics for each of the plurality of single-channel networks, and switch, in response to the plurality of communication fidelity metrics satisfying a condition, communication operations from a first of the plurality of single-channel networks to a second of the plurality of single-channel networks.

In yet another example, a method for wireless communication, which is implemented on a first wireless device of a plurality of wireless devices, is described. The first wireless device configured to support both a transmit mode and a receive mode in a first channel associated with a first single-channel network and a second channel associated with a second single-channel network. The method includes performing, using the receive mode and the transmit mode, data communications on the second channel, acquiring, using the receive mode on the second channel, at least one network advertisement message of a plurality of network advertisement messages, wherein each of the plurality of network advertisement messages comprises one or more characteristics of the first single-channel network, and performing, based on the at least one network advertisement message, a comparison between the first single-channel network and the second single-channel network.

In yet another example, the above-described method is embodied in the form of processor-executable code and stored in a computer-readable program medium.

In yet another example, a device that is configured or operable to perform the above-described method is disclosed.

The above examples and other aspects and their implementations are described in greater detail in the drawings, the descriptions, and the claims.

BRIEF DESCRIPTION OF THE DRAWINGS

FIGS. 2A and 2B show an example of a receiver-initiated guaranteed rendezvous and opportunistic rendezvous for a single-channel MANET DSA, respectively.

FIG. 8 shows a flowchart of an example method for wireless communication.

DETAILED DESCRIPTION

Figure 1:
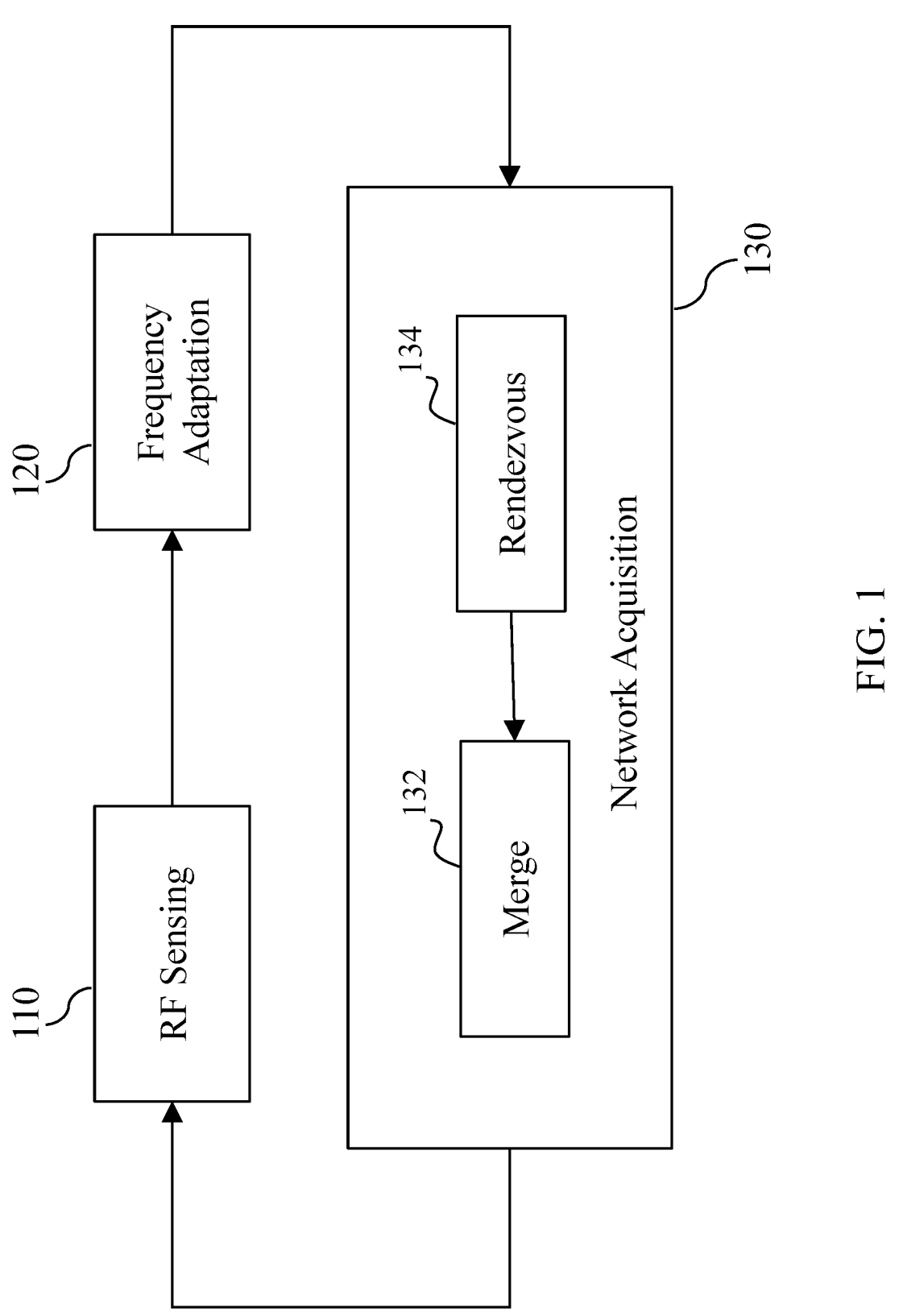
FIG. 1 shows an example functional block diagram of a dynamic spectrum access (DSA) module for a mobile ad-hoc network (MANET).

Implementations of dynamic spectrum access (DSA) focuses on three characteristics-frequency, location, and time. Devices continually use spectrum sensors to assess the radio spectrum environment and dynamically allocate or adjust frequencies as needed. Depending on the availability of frequencies in a given location and time, DSA will move users to unoccupied channels. This allows multiple network operators to use the same spectrum in different geographic locations as well as deploy more than one application per spectrum band.

Methods, systems, and devices for DSA for single-channel mobile ad-hoc networking (MANET) waveforms, which include embodiments for efficient execution of DSA network acquisition functions, are described. The described embodiments provide, among other features and benefits, more efficient of allocation of network resources, mitigation of problems associated with spectrum efficiency and scarcity, performance improvement of communication networks and systems, and/or resolution of signal interference issues.

Section headings are used in the present document for case of understanding and do not limit the applicability of techniques, methods, and embodiments disclosed in each section only to that section.

Initial Discussion

Multi-Channel DSA: A large variety of MANET DSA solutions are based on novel MAC protocols and/or platform hardware capability. Such solutions aim to fully leverage multi-channel MAC operation on a channel access-by-access basis. At a given time instance, the MANET network may be fragmented into parallel links between participating transmitter and receivers over different frequency channels. The ephemeral usage of frequency channels places a significant challenge on recurring rendezvous of transmitting and receiving nodes over frequency and time. Such DSA solutions typically lead to provisioning of a static control channel for frequent channel access coordination. The control channel communication may be either TDMA or CSMA (e.g., RTS/CTS). For radios with a single transceiver, existing implementations require all participating radios to remain on the common control channel by default until they acquire specific reservation schedule for communication over dynamically allocated frequency channel and time. When the radios are not operating on the common control channel, they are unavailable for potential coordination. Other implementations propose dual or multi-transceiver radios with one transceiver dedicated to the control channel. These DSA solutions are applicable to the operational concept of congested spectrum environments. However, they are vulnerable to the operations in contested spectrum environments, because the fixed control channel is not benefited from the resilience enabled by the concept of DSA. Yet other implementations purport to make the control channel dynamically elected, instead of statically configured. Nonetheless, significant channel time and/or transceiver resource is required for the maintenance of dynamic control channel(s). An example implementation does not specify a control channel. All channels may be used to exchange data schedule. It requires two-transceivers at each node. One of the transceivers is fully dedicated to scheduling receive for control messages by periodically rotating among all channels. Such schedule is assumed to be time synchronized among all nodes. If control message is received, the other transceiver kicks in and take over the subsequent data transmission(s) in the same channel, while the control transceiver is obligated to move on to the next channel in the rotating schedule. Another example implementation requires multi-transceiver capability in which a number of frequency channels are solely designated as control channels, separated from data channels. Control radios operate with a common fallback control channel, but they can adapt to other control channels based on local environment changes. Such dynamic adaptation requires either fully dedicated control radios or substantial channel time of a radio shared with data functions. In addition, separate narrowband busy tune transceiver(s) is also required to aid the multi-hop contention access.

Common channel DSA: An alternative DSA approach is to preserve the most parts of the single channel MANET operations, only allowing the operation channel to adapt across the entire network in a coordinated manner. This approach is particularly attractive to extend existing MANET waveforms with DSA capability. Furthermore, the rendezvous among radios occurs mainly at network acquisition events (network join and merge) instead of on a channel access-by-access basis. This enables MANET DSA solution without exorbitant rendezvous overhead using existing common single half duplex transceiver platforms.

Overview of Common Channel DSA

Traditional single-frequency MANET waveforms operate a static, pre-defined common frequency ("channel") to support multi-hop networking with self-configuration and self-healing capabilities. The ability to adapt the common operating channel can improve the resilience of the network, especially in congested RF environments in which the fidelity of a single operating channel may change dramatically over large time scales, i.e., few seconds to minutes and longer. The disclosed embodiments provide methods of adapting the common operating channel of a MANET, referred to as MANET DSA. As shown in FIG. 1, the MANET DSA includes an RF sensing function 110, a frequency adaptation function 120, and a network acquisition function 130, which are described below. In the example shown in FIG. 1, the network acquisition function 130 includes a merge function 132 and a rendezvous function 134.

RF Sensing: Participating MANET radios assess the RF condition of a plurality of channels (the operating channel and alternate channels), e.g., by measuring the prevalent noise and interference power. RF sensing can be integrated into the MANET waveform by allocating dedicated time slots: In one example, participating radios take measurements on a specific channel during the same sensing slot, then round-robin over the candidate channels in subsequent slots. RF sensing may also be performed by dedicated external RF sensors collocated with MANET radios, in which case the MANET waveform does not incur sensing time overhead. In order to map out the network-wide (global) RF conditions across the candidate channels, local RF sensing information may be disseminated to one or more nodes in the network, which involves additional overhead due to in-band signaling.

Frequency Adaptation: Participating radios may switch their operating channel when the current operating channel degrades. In general, radios do not adapt their frequencies independently of one another, but in concert with other nodes in the network. In one example, the network time reference may issue a frequency-switch command based on global knowledge of network RF conditions.

Network Acquisition: In the network acquisition phase, radios search for other radios and network fragments by advertising their current network, which is characterized by the operating channel and the time reference. The exchange of information between nodes operating on different channels is known as rendezvous and consumes additional channel resources. Based on the knowledge obtained via rendezvous, participating MANET radios attempt to converge into a common operating channel and time reference, referred to as merging. Merging can take place under various scenarios, including but not limited to:

a newly boot-up radio trying to acquire the operating channel and time reference of an existing network radios currently in a network looking for a better alternative network recovery of radios stranded on the previous operating channel(s) as a result of failed frequency adaptation, e.g., due to deteriorated local RF conditions Embodiments of the disclosed technology are described in the context of single-channel wireless network (e.g., a MANET), consisting of N radios that can transmit or receive RF energy in one frequency (channel) at a given time, out of K predetermined configurations. The network is assumed to have time-division multiple access (TDMA), provisioning for data slots for transmission and reception of user/application information ("data communications")

sensing slots for characterization of the RF background power control slots for transmission and reception of side information pertaining to data communications over different channels; including connectivity to the network, per-channel metrics for sensed RF background power, estimated fidelity of data communications, and estimated detectability of data communications by an adversary For the described embodiments, a sensing event refers to the measurement of the RF background power $s_L(k,n)$ on channel-k by radio-n for a plurality L of sensing slots. Without loss of generality, we focus on a single primary data service on the basis of which a frequency switch decision will be made.

Furthermore, the index of the operating frequency channel is denoted as $k_o$. In general, a communication fidelity metric $c(k_o)\varepsilon[0, 1]$ is assumed to be available for the lifetime of data networking over channel-$k_o$. An example communication fidelity metric is the message completion rate, which is disseminated over the control slots. A minimum metric $c_{min}$ describes the smallest tolerable fidelity for the underlying data traffic service.

Examples of Network Acquisition for MANET DSA

For a single-channel MANET with half-duplex radios, network acquisition rendezvous between radios with different operating channels involves one side initiating a channel switch to process either receive or transmit network acquisition control messages on its target rendezvous channel. These control messages will include various network attributes including the network time reference and other criteria that describes the overall health of the network. Upon successful rendezvous and processing of the network acquisition control messages, radios may align their time reference with the transmitter, and merge into the transmitter's network e.g., if the advertised network has better health.

Figures 2A, 2B:
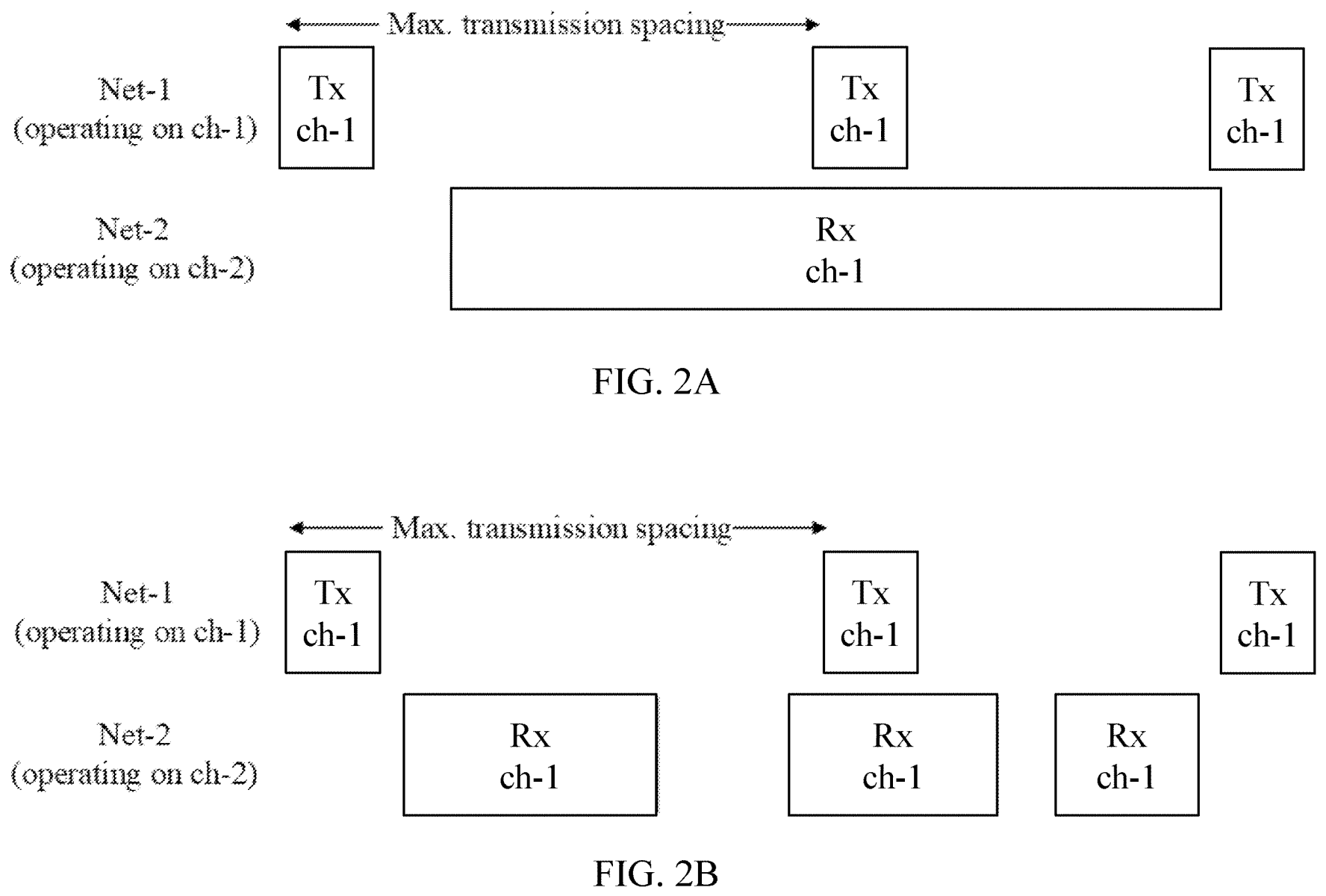

The traditional receive-initiated (Rx-initiated) rendezvous relies on receivers switching to the operating channels of the transmitters to decode network acquisition messages. FIGS. 2A and 2B illustrate Rx-initiated rendezvous mechanism between two single-channel networks (Net-1, Ne-2) of arbitrary time references operating over different channels (ch-1 and ch-2 respectively). In the guaranteed rendezvous schedule (FIG. 2A), (a subset of) radios in Net-1 periodically schedule transmit events, while (a subset of) radios in Net-2 schedule receive event(s), with each event duration no shorter than the maximum spacing of two consecutive network acquisition transmit events, ensuring the incidence of at least one control message during the receiving event. In opportunistic rendezvous schedule (FIG. 2B), (a subset of) radios in both networks schedule transmit and receive events opportunistically, typically when their respective networks are otherwise idle.

The receive dwell times on an alternate channel are typically much longer than the transmit events (acquisition message duration) in order to rendezvous with unknown time references for transmit and receive events. As a result, Rx-initiated mechanisms incur substantial overhead. The total rendezvous overhead is multiplied by the number of channels available for the DSA operation, which can be prohibitive.

Embodiments of the disclosed technology provide a Tx-initiated rendezvous mechanism, wherein the receivers of network acquisition messages always remain in their respective operating channels, and the rendezvous is established by the transmitters switching to the operating channels of the receivers. Compared to their traditional Rx-initiated variants, Tx-initiated mechanisms incur much lower rendezvous overhead because (i) the network acquisition transmit events are of much shorter duration than receive events, and (ii) the receive events can serve the dual purpose of acquisition control and regular data traffic transmission on the operating channel.

Figures 3A, 3B:
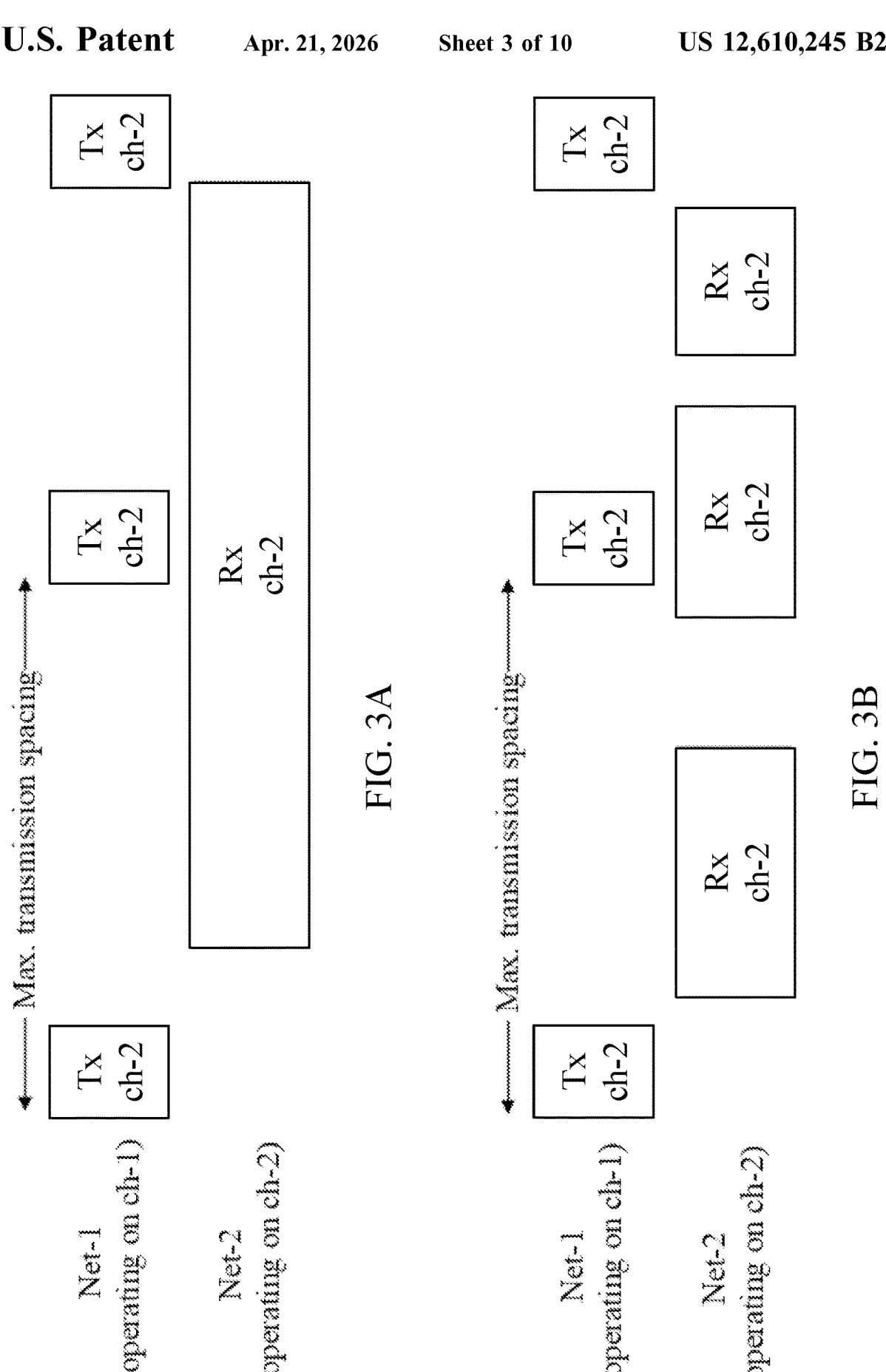
FIGS. 3A and 3B show an example of a transmitter-initiated guaranteed rendezvous and opportunistic rendezvous for a single-channel MANET DSA, respectively.

FIGS. 3A and 3B illustrates the Tx-initiated rendezvous mechanism between two single-channel networks (Net1, Net2) of arbitrary time references operating over different channels (ch-1 and ch-2 respectively). The Tx-initiated rendezvous mechanism introduces signal emissions on alternate channels, which may create unwanted interference with the potential primary users of those channels. In order to regulate the transmit events on alternate channels, the network acquisition is adapted as follows:

Based on of the RF Sensing Module (Assuming Energy-Based RF Sensing)

If RF sensing information is not available for an alternate channel, the network acquisition transmit is allowed on that channel.

If RF sensing information is available for an alternate channel, and if a signal is detected, the network acquisition transmit schedule shall be stopped on the alternate channel after a period during which potential rendezvous targets are given the opportunity to acquire the network. Since energy-based RF sensing does not distinguish primary spectrum user from a potential rendezvous target, network acquisition transmission is subsequently discontinued to avoid persistent interference potential primary spectrum user.

and if a signal is not detected, the network acquisition transmit will be stopped since there is no potential rendezvous target in the alternate channel.

Based on the Network Acquisition Rendezvous Module

If a network acquisition message is received regarding an alternate channel

If the alternate network is deemed to be better, transmit events to that alternate channel are decreased or stopped, and the process to merge into the alternate channel is started If the alternate network is deemed to be worse, the transmit event schedule to this alternate channel is increased to facilitate the merge of the alternate network If a network acquisition regarding an alternate channel is not available, the acquisition transmit schedule on this alternate channel is not modified.

Figure 4A:
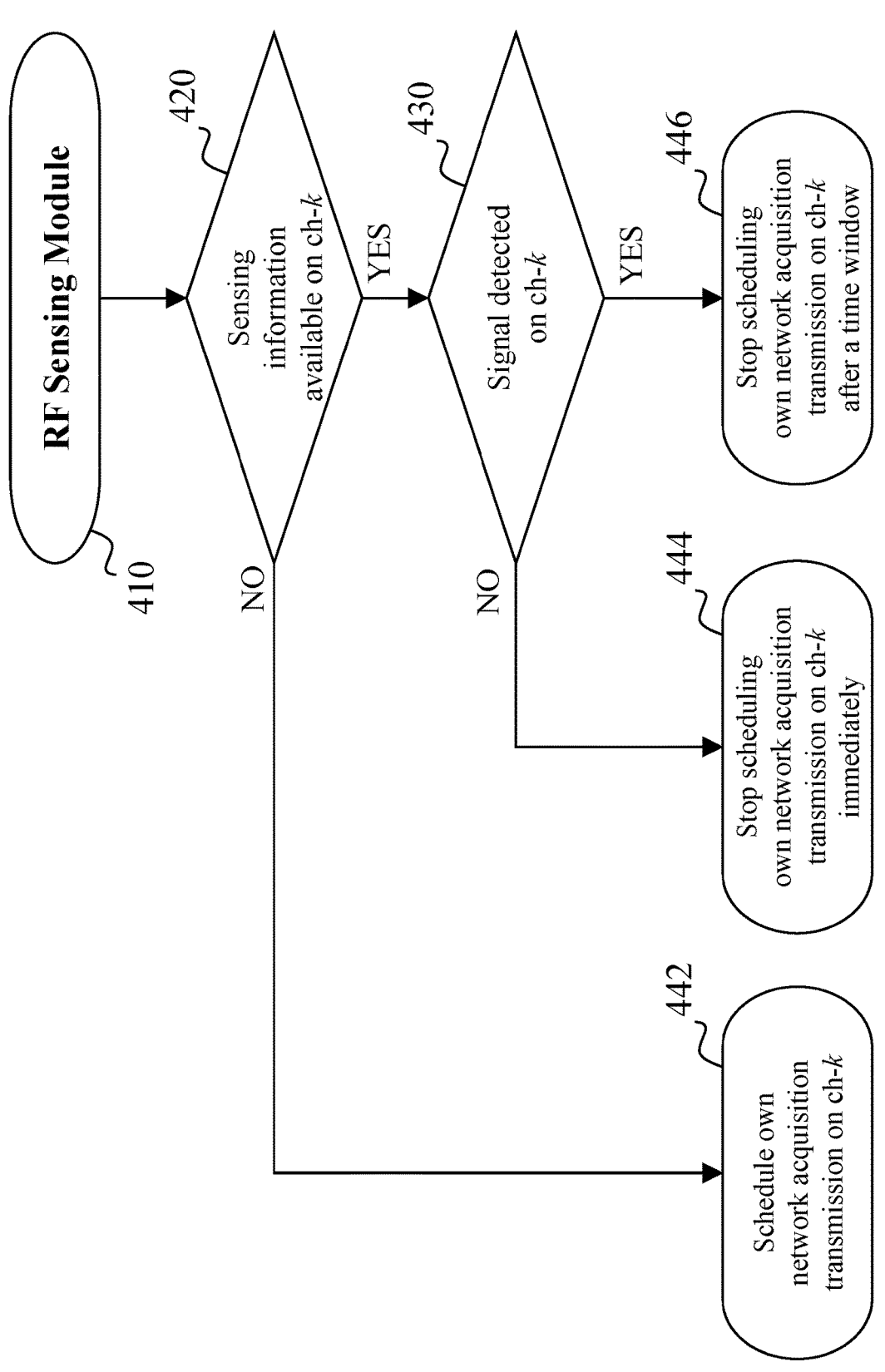
FIGS. 4A and 4B are flowcharts of example operations of the RF sensing module and the network acquisition rendezvous module, respectively.
Figure 4B:
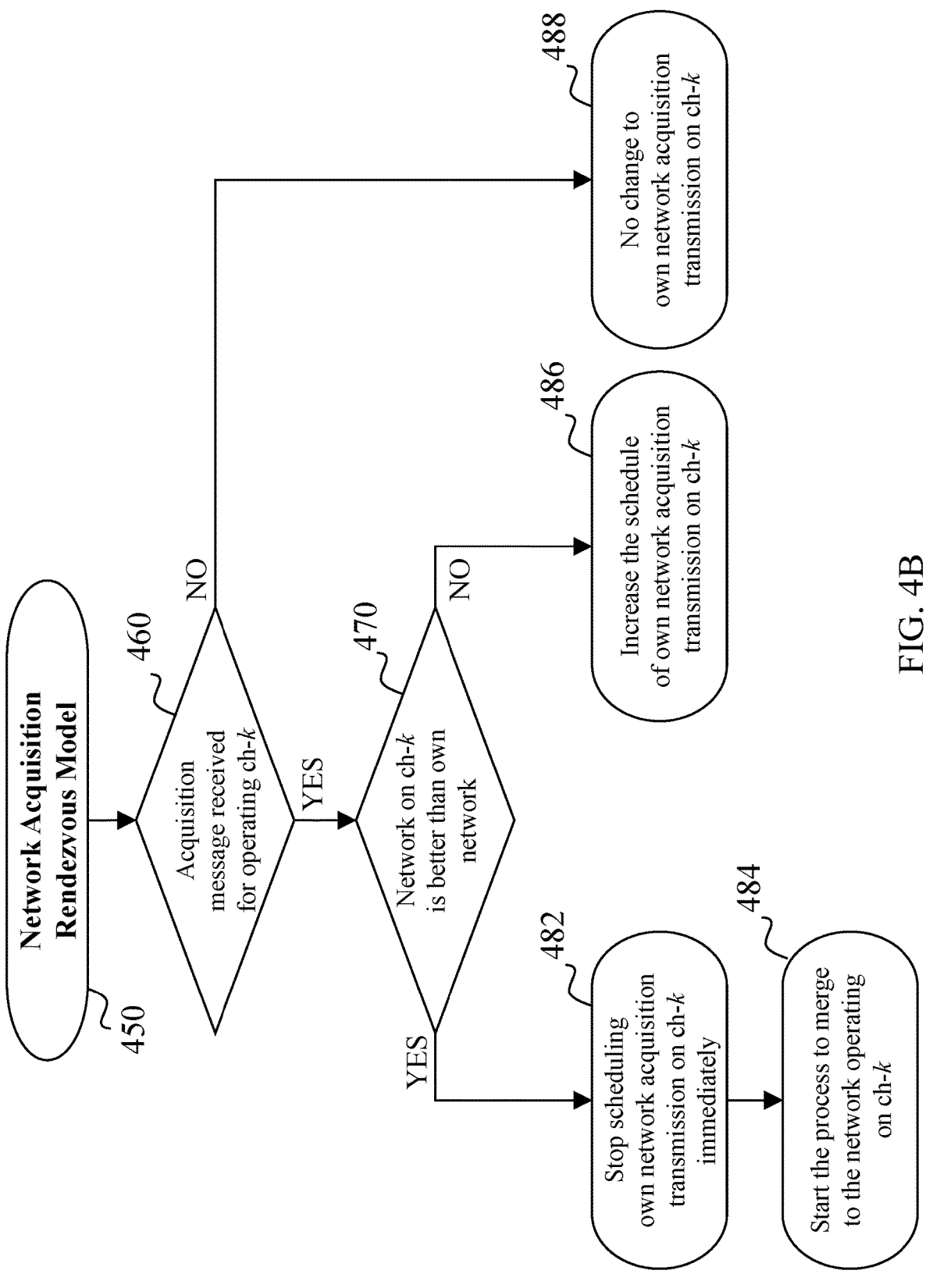

FIGS. 4A and 4B summarize the proposed adaptation of the network acquisition.

As shown in FIG. 4A, the RF sensing module 410 is configured to initially determine whether sensing information is available of a k-th channel (420). If no sensing information is available on the k-th channel ("NO" at 420), the RF sensing module will schedule its own network acquisition transmission on the k-th channel (442). Alternatively ("YES" at 420), the RF sensing module is configured to determine whether a signal is detected on the k-th channel (430). If a signal is detected on the k-th channel ("YES" at 430), the RF sensing module is configured to stop scheduling its own network acquisition transmission on the k-th channel after a time window (446), whereas if no signal is detected ("NO" at 430), the RF sensing module is configured to stop scheduling its own network acquisition transmission on the k-th channel immediately (444).

As shown in FIG. 4B, the network acquisition rendezvous module 450 is configured to initially determine whether an acquisition message is received for the k-th operating channel (460). If an acquisition message is not received ("NO" at 460), then there is no change to the network acquisition transmission on the k-th channel for this node. However, if an acquisition message is received ("YES" at 460), the network acquisition rendezvous module 450 is configured to determine, based on the received acquisition message, whether the network on the k-th channel is better than its own (current) network (470). If the current network is better (e.g., based on one or more characteristics of each of the networks) than the network on the k-th channel ("NO" at 470), then the schedule of its own network acquisition transmissions on the k-th channel are increased (486). Alternatively, if the network on the k-th channel is better than its own network ("YES" at 470), then the network acquisition rendezvous module 450 is configured to stop scheduling its own network acquisition transmissions on the k-th channel immediately (482) and start to process the merge operation to the network operating on the k-th channel (484).

Examples of Cooperative Communication

In some embodiments, in the Tx-initiated rendezvous mechanism, multiple transmitters may follow the same channel access protocol to avoid potential transmit collision on the alternate channel. With the above adaptation to regulate the transmit schedule, the interference to potential primary spectrum user on any alternate channel is minimized to a temporal period. Nevertheless, within the period, there may be numerous transmit events from multiple radios. This is necessary to improve the geographic coverage of network acquisition messages in MANETs with multi-hop topology.

In some embodiments, if cooperative communication transmission is feasible in a specific MANET waveform, all transmitters may share a common network acquisition transmit event without worrying about collision. By adopting cooperative communication transmission, the potential interference footprint is further reduced.

Figure 5:
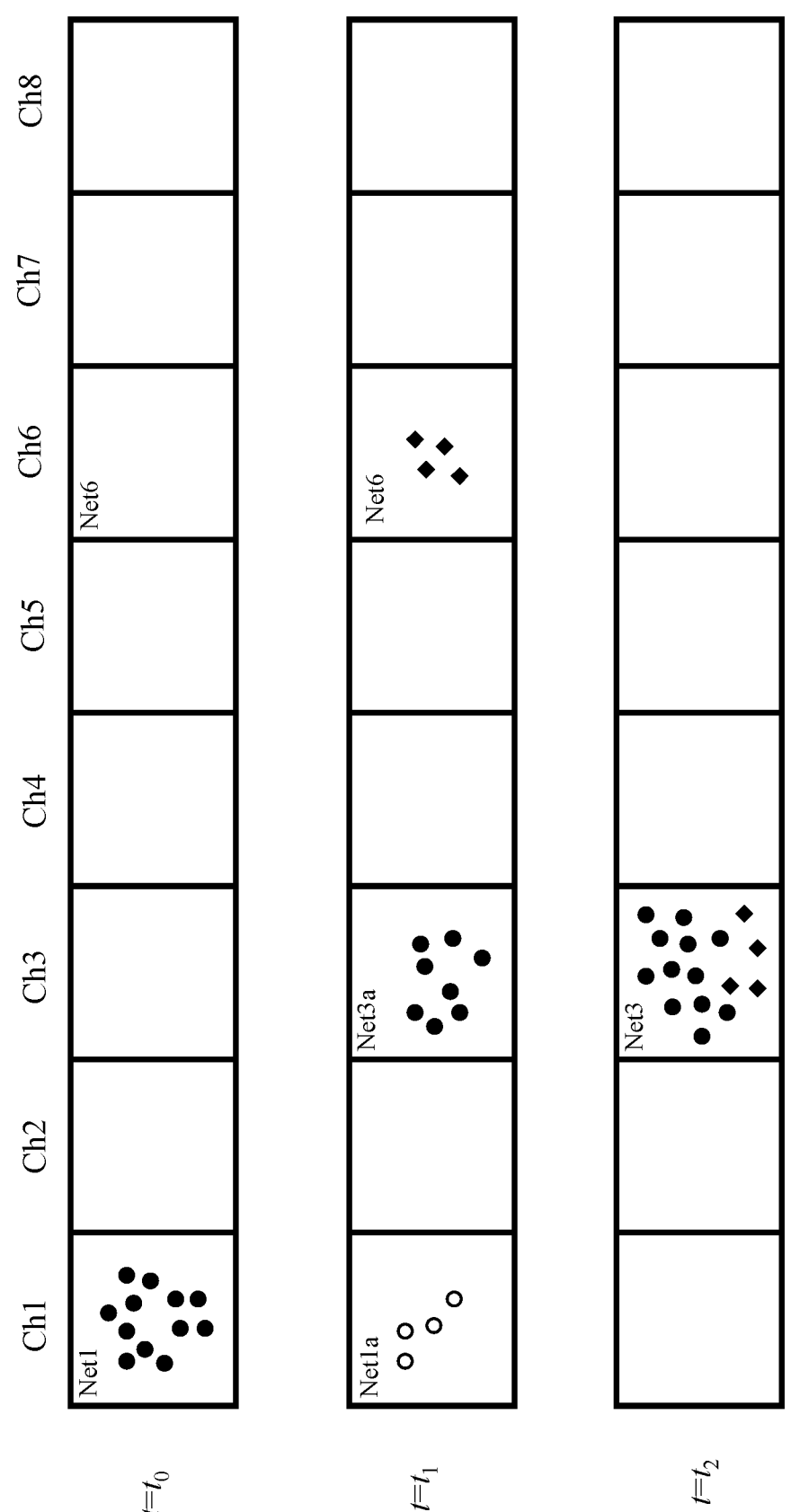
FIG. 5 shows an example of radios switching networks and channel in accordance with the described embodiments.

FIG. 5 shows another example of a group of radios switching between channels and networks in accordance with the described embodiments. As depicted in FIG. 5, the example system consists of eight channels (Ch1, Ch2, . . . , Ch8) the networks can access. Therein:

At t=t0, there is a network Net1 on operating channel Ch1

At t=t1, Net1 decides to switch to operating channel Ch3, but some subset of nodes in Net1 cannot execute the frequency switch (e.g., those radios did not hear the message), and as a result, they form their own network, Net1a, still operating in Ch1. The rest of the radios from Net1 form the Net3a operating on Ch3. In this same epoch, another group of radios boot up on Ch6, and start the network Net6.

At t=t2, both Net1a and Net6 deem Net3a as a better network and decide to merge to it. The resultant network is Net3.

Figure 6:
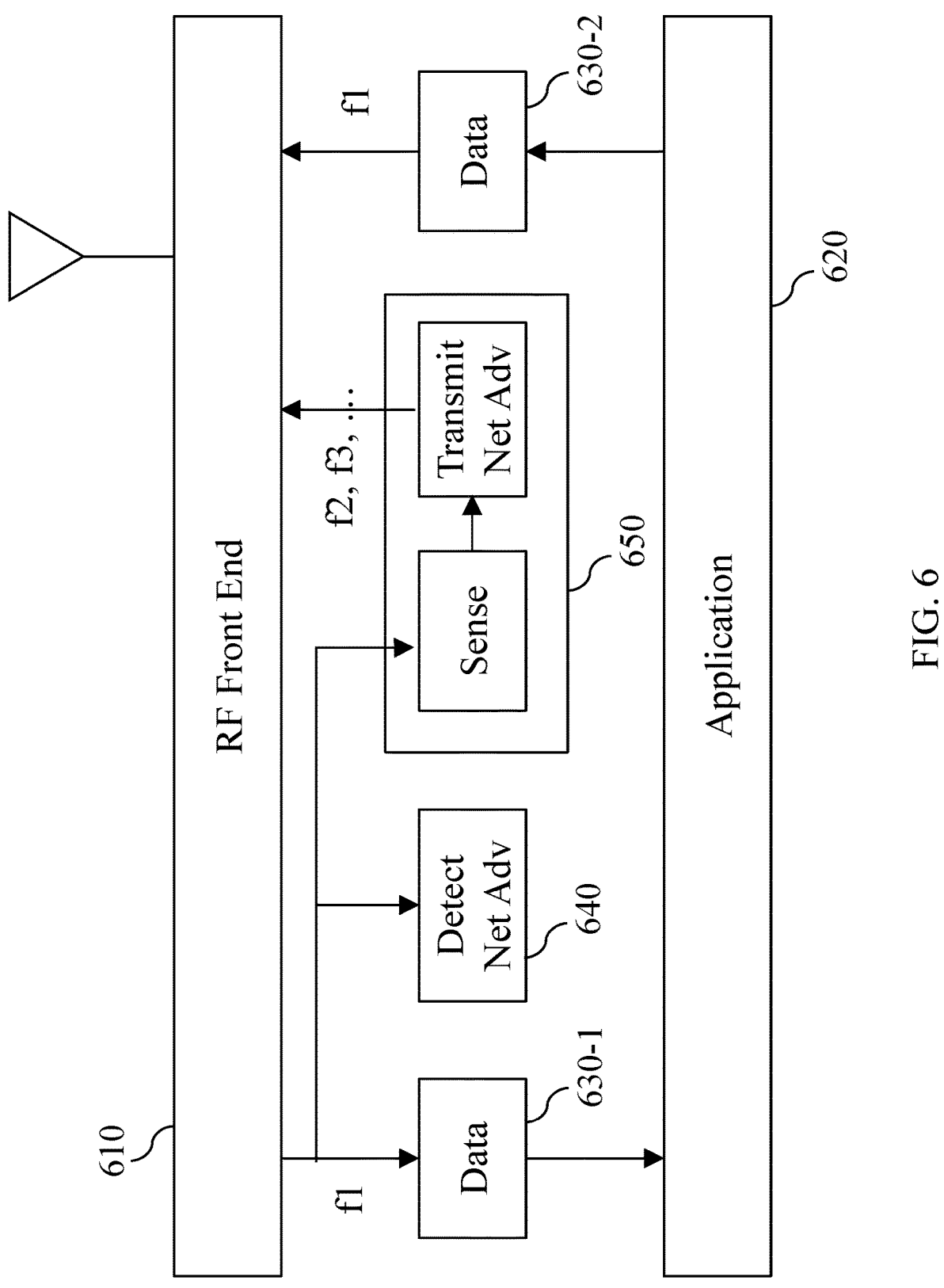
FIG. 6 shows a block diagram representation of another radio that can implement a method or technique described in this patent document.

FIG. 6 shows another block diagram representation of radios that can, for example, implement a method or technique described in the context of FIG. 5. As shown therein, the radio includes an RF front end 610 and an application 620, which are communicatively coupled to each other. The example radio shown in FIG. 6 primarily operates (e.g., receives and sends data) on frequency f1 (using 630-1 and 630-2). In addition, it detects network advertisements from other networks that are broadcast on f1 (640, "Detect Net Adv"), as well as senses f1 and advertises its own network on other frequencies, e.g., f2, f3, . . . . (650, "Sense" and "Transmit Net Adv"). The radio shown in FIG. 6 can, for example, implement the methods described in the context of FIGS. 3A, 3B, 4A and 4B.

Examples of Frequency Switching for MANET DSA

Interference-Avoidance DSA (IA-DSA). The sensing metric is the RF background power, commonly known as the Received Signal Strength (RSS). The sensing metrics are disseminated across the network to a central node, which correlates the perceived communication fidelity $c(k_o)$ with the available sensing metrics $\{s_L(k_o,n), 1 \leq n \leq N\}$, and computes a parametric mapping $s_L(k_o)=(1, s_L(k_o,1), \ldots, s_L(k_o, N))^T \to \hat{c}(k_o)$. The mapping could be performed in a variety of ways, e.g., using standard logistic regression, $$\hat{c}(k_o)=\sigma(w^T(k_o)s_L(k_o))$$

where $\sigma$ is the sigmoid (or another similar compressive) function, and the parameter vector $w(k_o)$ is chosen to minimize $\|c(k_o)-\hat{c}(k_o)\|^2$ across contiguous epochs of data communications in channel-$k_o$ typically using gradient-based adaptation. At start-up, communication fidelity metrics may only be available for a first operating channel, and one may select $w(k)=w(k_o)$, to estimate $c(k)$ for $k \neq k_o$. As other frequencies are exercised as operating channels, the mapping is evolved based on the prevalent communication fidelity metric.

In steady-state operation, the central node produces an estimate $\hat{c}(k)$ of the communication fidelity for each available channel and decides whether the frequency switch is warranted. In one example, an alternate channel $k_1 \neq k_o$ is selected as the new operating frequency if $c(k_o)<c_{min}$ and $\hat{c}(k_1) \geq \hat{c}(k)$ for all k. If a frequency switch decision is made by the central node, it is disseminated to the rest of the network, upon which network acquisition (rendezvous and merge) phase starts. Furthermore, if $\hat{c}(k_1)<c_{min}$, a slower (more resilient) signaling mode may be selected to improve communication fidelity.

Low Detectability DSA (LD-DSA). A key consideration in tactical networking is to communicate reliably while avoiding detection by adversary interception platforms. In general, the presence of interference inhibits detectability, therefore communications may be preferred in channels with tolerable levels of interference. In LD-DSA (and as illus-

Figure 7:
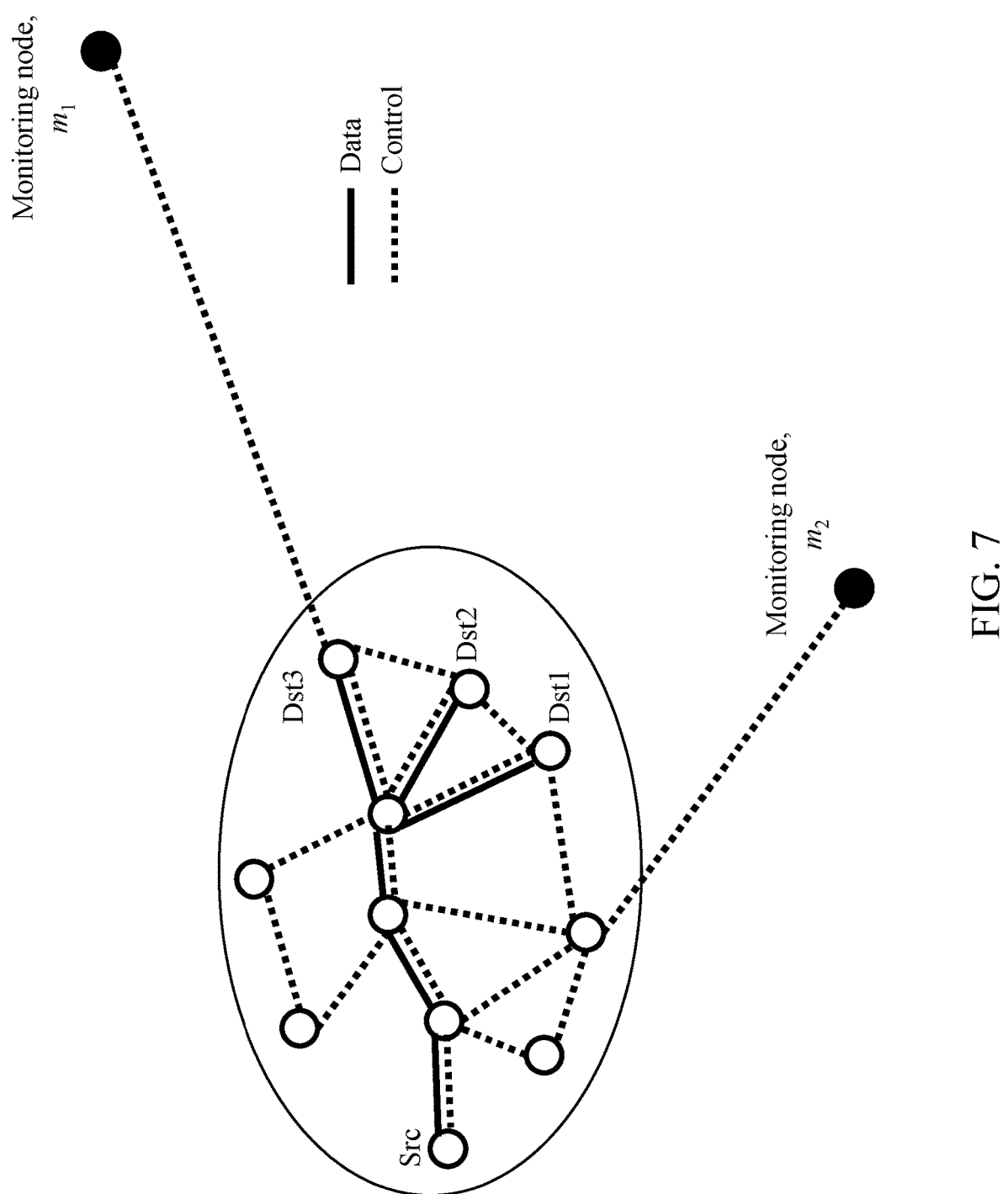
FIG. 7 shows a network that can be configured to implement frequency switching.

9 trated in FIG. 7), a plurality of networked nodes, called monitoring nodes, is designated to assess the detectability of the communications on the operating channel, from an adversary's perspective, i.e., using the timing and frequency information available to the network but not the knowledge regarding specific probe or synchronization sequences only available to the network node. Such detectors are known non-cooperative detectors. An example non-cooperative detector performs detection based on sensed RF power, which is already available during the sensing slots. These detectors are also called radiometric or energy-based detectors. Note that the inherent exploitation of the timing and frequency information represents an advantaged adversary condition. Monitoring nodes are connected to the network; therefore, have full knowledge of the TDMA schedule, but do not actively participate in the data slots (they do not act generate traffic or act as relays during the data slots).

In order to form a detection test, a monitoring node m (which mimics an adversary node) configures a detection threshold for each candidate channel. With radiometric/ power detection, the detection threshold is given by $$\tau(k, m) = \left( \frac{Q^{-1}(p_{FA})}{\sqrt{BT}} + 1 \right) s_L(k, m)$$

where $p_{FA}$ is a desired probability of false alarm (FA), B is the instantaneous bandwidth of the data communications, and T is the duration sensing observables (effective duration of the sensing slot), and $Q^{-1}$( ) is the inverse complementary cumulative distribution function (CCDF) for standard normal (Gaussian) statistics. During the data slots, the monitoring node collects statistics regarding how frequently the RF background power exceeds the configured threshold, representing an adversary's probability of detection:

$$p_D(k_o,m)=\text{Prob}(s_L(k_o,m)>\tau(k_o,m))$$

The statistics $\{p_D(m)\}$ are reported to a central node, which formulates a final probability of detectability $p_D(k_o)$, possibly taking into account the propagation conditions from the core data network to each monitoring node.

The LD-DSA frequency switch decision takes into account the estimated communication fidelity $\{\hat{c}(k)\}$ on all channels, as well as the perceived detectability, $p_D(k_o)$, of the operating channel. When low-detectability is of primary importance, a frequency switch command is issued as soon as $p_D(k_o)>p_{D,max}$, and a new operating channel $k_1$ is selected as $k_1=\text{argmax}_{k\neq ko}\hat{c}(k)$, even when $\hat{c}(k_1)<\hat{c}(k_o)$.

Example Embodiments of the Disclosed Technology

The described embodiments include a system for network management comprising a first wireless device configured to perform, using a receive mode and a transmit mode, data communications on a first channel associated with a first single-channel network, and transmit, using the transmit mode, a plurality of network advertisement messages on a second channel associated with a second single-channel network, wherein each of the plurality of network advertisement messages comprises one or more characteristics of the first single-channel network, and a second wireless device configured to perform, using the receive mode and the transmit mode, data communications on the second channel, acquire, using the receive mode, at least one network advertisement message of the plurality of network advertisement messages on the second channel, and perform, based on the at least one network advertisement message, a comparison between the first single-channel network and the second single-channel network.

The described embodiments include another system for network management comprising a plurality of nodes, wherein each of the plurality of nodes is configured to operate, using a time-division multiple access (TDMA) protocol, over a corresponding channel of each of a plurality of single-channel networks, wherein the plurality of nodes comprises a central node configured to determine, based on a plurality of sensing metrics associated with each of the plurality of nodes, a plurality of communication fidelity metrics for each of the plurality of single-channel networks, and switch, in response to the plurality of communication fidelity metrics satisfying a condition, communication operations from a first of the plurality of single-channel networks to a second of the plurality of single-channel networks.

FIG. 8 is a flowchart of an example method of wireless communication implemented on a first wireless device of a plurality of wireless devices, the first wireless device configured to support both a transmit mode and a receive mode in a first channel associated with a first single-channel network and a second channel associated with a second single-channel network, the method 800 including, at operation 810, performing, using the receive mode and the transmit mode, data communications on the second channel.

The method includes, at operation 820, acquiring, using the receive mode on the second channel, at least one network advertisement message of a plurality of network advertisement messages, wherein each of the plurality of network advertisement messages comprises one or more characteristics of the first single-channel network.

The method includes, at operation 830, performing, based on the at least one network advertisement message, a comparison between the first single-channel network and the second single-channel network.

The Disclosed Embodiments Provide, Inter Alia, the Following Technical Solutions:

1. A system for wireless communication, comprising a first single-channel network configured for communication using a first channel, a second single-channel network configured for communication using a second channel, a first wireless device configured to transmit, using a transmit mode, a plurality of network advertisement messages on the second channel, wherein each of the plurality of network advertisement messages comprises one or more characteristics of the first single-channel network, and a second wireless device configured to acquire, using a receive mode, at least one network advertisement message of the plurality of network advertisement messages on the second channel, and perform, based on the at least one network advertisement message, a comparison between the first single-channel network and the second single-channel network.

2. A system for wireless communication, comprising a first wireless device configured to transmit, using a transmit mode, a plurality of network advertisement messages on a second channel associated with a second single-channel network, wherein each of the plurality of network advertisement messages comprises one or more characteristics of a first single-channel network configured for communication using a first channel, and a second wireless device configured to acquire, using a receive mode, at least one network advertisement message of the plurality of network advertisement messages on the second channel, and perform, based on the at least one network advertisement message, a comparison between the first single-channel network and the second single-channel network.

3. The system of solution 1 or 2, wherein the first wireless device is further configured to perform, using the receive mode and the transmit mode, data communications on the first channel, and wherein the second wireless device is further configured to perform, using the receive mode and the transmit mode, data communications on the second channel.

4. A system for wireless communication, comprising a first wireless device configured to perform, using a receive mode and a transmit mode, data communications on a first channel associated with a first single-channel network, and transmit, using the transmit mode, a plurality of network advertisement messages on a second channel associated with a second single-channel network, wherein each of the plurality of network advertisement messages comprises one or more characteristics of the first single-channel network, and a second wireless device configured to perform, using the receive mode and the transmit mode, data communications on the second channel, acquire, using the receive mode, at least one network advertisement message of the plurality of network advertisement messages on the second channel, and perform, based on the at least one network advertisement message, a comparison between the first single-channel network and the second single-channel network.

5. The system of any of solutions 1 to 4, wherein the second wireless device is further configured to determine, based on the comparison, that at least one characteristic of the first single-channel network exceeds a corresponding characteristic of the second single-channel network, switch from the second single-channel network to the first single-channel network, and perform subsequent data communications on the first single-channel network.

6. The system of any of solutions 1 to 4, wherein the second wireless device is further configured to determine, based on the comparison, that at least one characteristic of the second single-channel network exceeds a corresponding characteristic of the first single-channel network, and perform subsequent data communications on the second single-channel network.

7. The system of any of solutions 1 to 4, wherein the first wireless device is further configured to perform, prior to transmitting the plurality of network advertisement messages, a radio frequency (RF) sensing operation on the second channel.

8. The system of solution 7, wherein the first wireless device is further configured to determine, based on the RF sensing operation, that a signal communication is currently being performed on the second channel, and refrain from transmitting, for a predetermined time duration, the plurality of network advertisement messages on the second channel.

9. The system of any of solutions 1 to 4, wherein a data message of the data communications and the at least one network advertisement message are received concurrently by the second wireless device on the second channel.

10. The system of any of solutions 1 to 4, wherein the one or more characteristics include at least one or a bit error rate (BER), a frame error rate (FER), a message completion rate (MCR), a signal-to-noise ratio (SNR), or a signal-to-interference-plus-noise ratio (SINR).

11. The system of any of solutions 1 to 4, wherein the plurality of network advertisement messages are transmitted at a band edge of the second channel.

12. The system of any of solutions 1 to 4, wherein the plurality of network advertisement messages are spread over a bandwidth of the second channel.

13. The system of any of solutions 1 to 4, wherein a time-domain multiple access (TDMA) configuration of the first single-channel network is not aligned with a TDMA configuration of the second single-channel network.

14. The system of any of solutions 1 to 4, wherein each of the first single-channel network and the second single-channel network is a barrage relay network.

15. A system of communication nodes, comprising a plurality of nodes, wherein each of the plurality of nodes is configured to operate, using a time-division multiple access (TDMA) protocol, over a corresponding channel of each of a plurality of single-channel networks, wherein the plurality of nodes comprises a central node configured to determine, based on a plurality of sensing metrics associated with each of the plurality of nodes, a plurality of communication fidelity metrics for each of the plurality of single-channel networks, and switch, in response to the plurality of communication fidelity metrics satisfying a condition, communication operations from a first of the plurality of single-channel networks to a second of the plurality of single-channel networks.

16. The system of solution 15, wherein the condition comprises the communication fidelity metric of the first single-channel network being less than a first threshold and the communication fidelity metric of the second single-channel network being greater than the communication fidelity metric for any other single-channel network.

17. The system of solution 15, wherein the condition comprises a probability of detectability metric of the first single-channel network being greater than a first threshold, and wherein the probability of detectability metric for a respective single-channel network is determined based on a desired probability of false alarm, an instantaneous bandwidth of the corresponding single-channel network, and the sensing metric for the corresponding single-channel network.

18. The system of solution 17, wherein the probability of detectability metric is determined by a monitoring node that mimics a node that is adversarial to the plurality of the nodes.

19. The system of any of solutions 15 to 18, wherein each of the plurality of sensing metrics is a received signal strength (RSS) measurement for a corresponding node of the plurality of nodes.

20. The system of any of solutions 15 to 18, wherein the TDMA protocol comprises a data slot for communication of user or application information, a sensing slot for characterization of a radio frequency (RF) background power, and a control slot for communication of side information associated with connectivity between the plurality of nodes, frequency switching, or detectability of data communications between the plurality of nodes.

21. A method of wireless communication, implemented on a first wireless device of a plurality of wireless devices, the first wireless device configured to support both a transmit mode and a receive mode in a first channel associated with a first single-channel network and a second channel associated with a second single-channel network, the method comprising performing, using the receive mode and the transmit mode, data communications on the second channel, acquiring, using the receive mode on the second channel, at least one network advertisement message of a plurality of network advertisement messages, wherein each of the plurality of network advertisement messages comprises one or more characteristics of the first single-channel network, and performing, based on the at least one network advertisement message, a comparison between the first single-channel network and the second single-channel network.

22. The method of solution 21, further comprising determining, based on the comparison, that at least one characteristic of the first single-channel network exceeds a corresponding characteristic of the second single-channel network, switching from the second single-channel network to the first single-channel network, and performing subsequent data communications on the first single-channel network.

23. The method of solution 21, further comprising determining, based on the comparison, that at least one characteristic of the second single-channel network exceeds a corresponding characteristic of the first single-channel network, and performing subsequent data communications on the second single-channel network.

24. The method of any of solutions 21 to 23, wherein a data message of the data communications and the at least one network advertisement message are received concurrently on the second channel.

25. The method of any of solutions 21 to 23, wherein the one or more characteristics include at least one or a bit error rate (BER), a frame error rate (FER), a message completion rate (MCR), a signal-to-noise ratio (SNR), or a signal-to-interference-plus-noise ratio (SINR).

26. The method of any of solutions 21 to 23, wherein the plurality of network advertisement messages are acquired at a band edge of the second channel.

27. The method of any of solutions 21 to 23, wherein the plurality of network advertisement messages are spread over a bandwidth of the second channel.

28. The method of any of solutions 21 to 23, wherein a time-domain multiple access (TDMA) configuration of the first single-channel network is not aligned with a TDMA configuration of the second single-channel network.

29. The method of any of solutions 21 to 23, wherein each of the first single-channel network and the second single-channel network is a barrage relay network.

Figure 9:
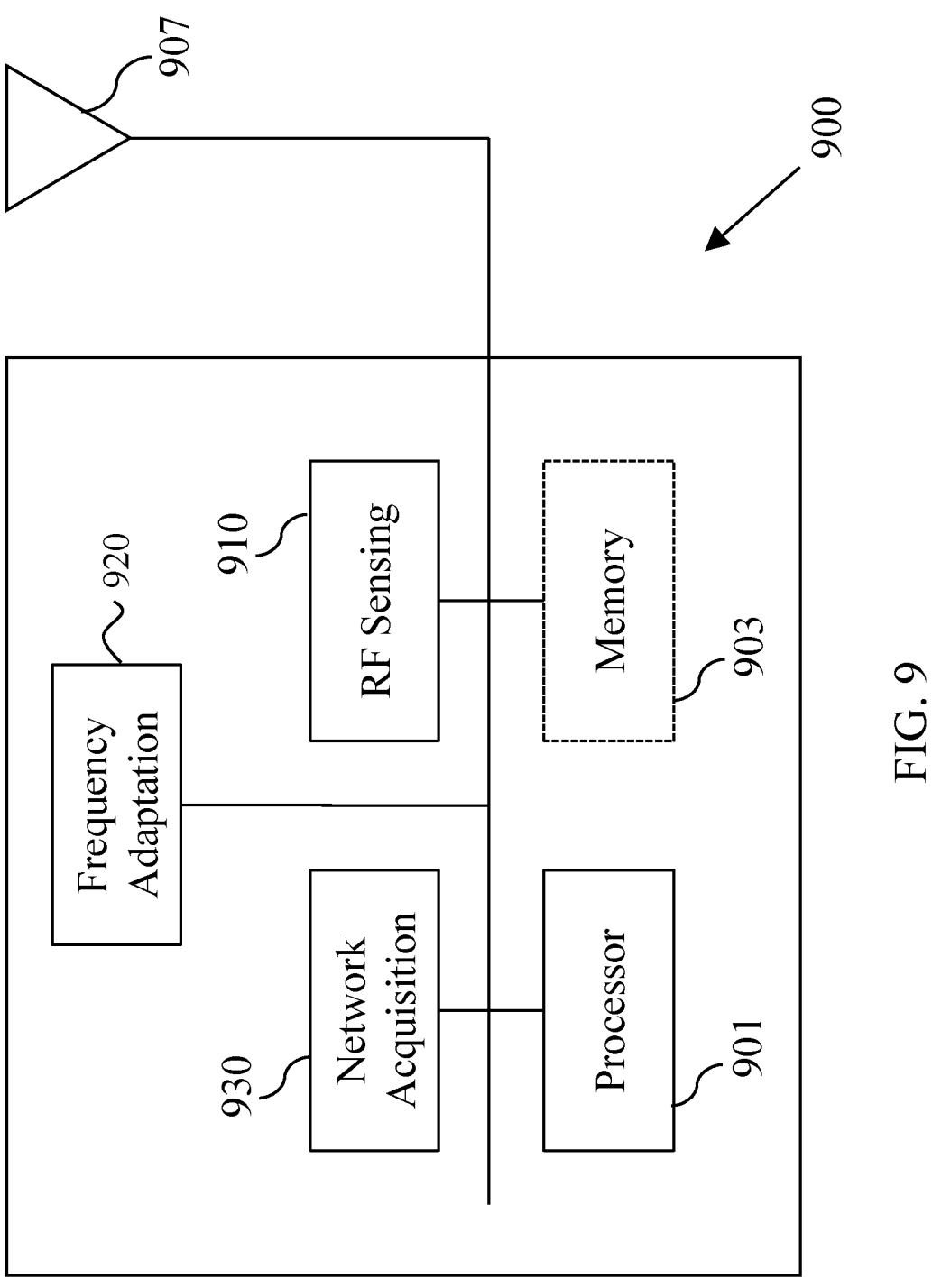
FIG. 9 is a block diagram representation of a portion of an apparatus that may implement a method or technique described in this patent document.

FIG. 9 is a block diagram representation of a portion of an apparatus, in accordance with some embodiments of the presently disclosed technology. An apparatus 900 can include a processor 901 (e.g., a microprocessor) that implements one or more of the techniques presented in this document. Apparatus 900 can optionally include one or more memories 903 configured to store information such as data and/or instructions. The apparatus 900 can further include an RF sensing module 910, a frequency adaptation module 920, and a network acquisition module 930, each of which are communicatively coupled to the processor 901 and the memory 903. In some embodiments, the apparatus 900 may be further configured to send and/or receive wireless signals over one or more communication interfaces such as antenna 907. In some embodiments, one or more of the RF sensing module 910, the frequency adaptation module 920, and the network acquisition module 930 may be implemented in the processor 901. At least some of the disclosed techniques, modules or functions are implemented using the apparatus 900. For example, the apparatus 900 may be used to implement wireless device or communication nodes, also called nodes, described herein.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements, and variations can be made based on what is described and illustrated in this patent document.

What is claimed is:

1. A system for wireless communication, comprising:
a first single-channel network configured for communication using a first channel;
a second single-channel network configured for communication using a second channel;
a first wireless device configured to:
transmit, using a transmit mode, a plurality of network advertisement messages on the second channel, wherein each of the plurality of network advertisement messages comprises one or more characteristics of the first single-channel network; and
a second wireless device configured to:
acquire, using a receive mode, at least one network advertisement message of the plurality of network advertisement messages on the second channel, and
perform, based on the at least one network advertisement message, a comparison between the first single-channel network and the second single-channel network.

2. The system of claim 1, wherein the first wireless device is further configured to perform, using the receive mode and the transmit mode, data communications on the first channel, and wherein the second wireless device is further configured to perform, using the receive mode and the transmit mode, data communications on the second channel.

3. A system for wireless communication, comprising:
a first wireless device configured to:
perform, using a receive mode and a transmit mode, data communications on a first channel associated with a first single-channel network, and
transmit, using the transmit mode, a plurality of network advertisement messages on a second channel associated with a second single-channel network, wherein each of the plurality of network advertisement messages comprises one or more characteristics of the first single-channel network; and
a second wireless device configured to:
perform, using the receive mode and the transmit mode, data communications on the second channel,
acquire, using the receive mode, at least one network advertisement message of the plurality of network advertisement messages on the second channel, and
perform, based on the at least one network advertisement message, a comparison between the first single-channel network and the second single-channel network.

4. The system of claim 3, wherein the second wireless device is further configured to:
determine, based on the comparison, that at least one characteristic of the first single-channel network exceeds a corresponding characteristic of the second single-channel network;
switch from the second single-channel network to the first single-channel network; and
perform subsequent data communications on the first single-channel network.

5. The system of claim 3, wherein the second wireless device is further configured to:
determine, based on the comparison, that at least one characteristic of the second single-channel network exceeds a corresponding characteristic of the first single-channel network; and
perform subsequent data communications on the second single-channel network.

6. The system of claim 3, wherein the first wireless device is further configured to:
perform, prior to transmitting the plurality of network advertisement messages, a radio frequency (RF) sensing operation on the second channel.

7. The system of claim 6, wherein the first wireless device is further configured to:
determine, based on the RF sensing operation, that a signal communication is currently being performed on the second channel; and
refrain from transmitting, for a predetermined time duration, the plurality of network advertisement messages on the second channel.

8. The system of claim 3, wherein a data message of the data communications and the at least one network advertisement message are received concurrently by the second wireless device on the second channel.

9. The system of claim 3, wherein the one or more characteristics include at least one or a bit error rate (BER), a frame error rate (FER), a message completion rate (MCR), a signal-to-noise ratio (SNR), or a signal-to-interference-plus-noise ratio (SINR).

10. The system of claim 3, wherein the plurality of network advertisement messages are either transmitted at a band edge of the second channel or spread over a bandwidth of the second channel.

11. The system of claim 3, wherein a time-domain multiple access (TDMA) configuration of the first single-channel network is not aligned with a TDMA configuration of the second single-channel network.

12. The system of claim 3, wherein each of the first single-channel network and the second single-channel network is a barrage relay network.

13. A method of wireless communication, implemented on a first wireless device of a plurality of wireless devices, the first wireless device configured to support both a transmit mode and a receive mode in a first channel associated with a first single-channel network and a second channel associated with a second single-channel network, the method comprising:

performing, using the receive mode and the transmit mode, data communications on the second channel;

acquiring, using the receive mode on the second channel, at least one network advertisement message of a plurality of network advertisement messages, wherein each of the plurality of network advertisement messages comprises one or more characteristics of the first single-channel network; and performing, based on the at least one network advertisement message, a comparison between the first single-channel network and the second single-channel network.

14. The method of claim 13, further comprising:

determining, based on the comparison, that at least one characteristic of the first single-channel network exceeds a corresponding characteristic of the second single-channel network;

switching from the second single-channel network to the first single-channel network; and

18 performing subsequent data communications on the first single-channel network.

15. The method of claim 13, further comprising:

determining, based on the comparison, that at least one characteristic of the second single-channel network exceeds a corresponding characteristic of the first single-channel network; and performing subsequent data communications on the second single-channel network.

16. The method of claim 13, wherein a data message of the data communications and the at least one network advertisement message are received concurrently on the second channel.

17. The method of claim 13, wherein the one or more characteristics include at least one or a bit error rate (BER), a frame error rate (FER), a message completion rate (MCR), a signal-to-noise ratio (SNR), or a signal-to-interference-plus-noise ratio (SINR).

18. The method of claim 13, wherein the plurality of network advertisement messages are either acquired at a band edge of the second channel or spread over a bandwidth of the second channel.

19. The method of claim 13, wherein a time-domain multiple access (TDMA) configuration of the first single-channel network is not aligned with a TDMA configuration of the second single-channel network.

20. The method of claim 13, wherein each of the first single-channel network and the second single-channel network is a barrage relay network.

* * * * *